United States Patent
Srinivasan

(10) Patent No.: US 12,430,410 B2
(45) Date of Patent: Sep. 30, 2025

(54) SYSTEM AND PROCESS FOR DELIVERING SECURE COMPUTERIZED CONTAINER BASED APPLICATIONS

(71) Applicant: Orcasio Inc, Frisco, TX (US)

(72) Inventor: Ragunathan Srinivasan, Lewisville, TX (US)

(73) Assignee: Orcasio Inc, Frisco, TX (US)

( * ) Notice: Subject to any disclaimer, the term of this patent is extended or adjusted under 35 U.S.C. 154(b) by 456 days.

(21) Appl. No.: 17/944,331

(22) Filed: Sep. 14, 2022

(65) Prior Publication Data

US 2023/0106781 A1 Apr. 6, 2023

Related U.S. Application Data

(60) Provisional application No. 63/252,745, filed on Oct. 6, 2021.

(51) Int. Cl.
| | |
|---|---|
| *G06F 21/16* | (2013.01) |
| *G06F 21/64* | (2013.01) |
| *H04L 9/32* | (2006.01) |

(52) U.S. Cl.
CPC .................. *G06F 21/16* (2013.01)

(58) Field of Classification Search
CPC ......... G06F 21/16; G06F 21/64; H04L 9/3213
See application file for complete search history.

(56) References Cited

U.S. PATENT DOCUMENTS

| | | | |
|---|---|---|---|
| 9,009,840 B1* | 4/2015 | Stickle | G06F 21/10 726/17 |
| 2020/0026505 A1* | 1/2020 | Olderdissen | G06F 9/44526 |
| 2024/0195779 A1* | 6/2024 | Komu | G06F 9/45558 |
| 2024/0348453 A1* | 10/2024 | Fokle Kokou | G06F 21/53 |

* cited by examiner

*Primary Examiner* — Trong H Nguyen
(74) *Attorney, Agent, or Firm* — Collard & Roe, P.C.

(57) ABSTRACT

There is disclosed a process for signing an image file as well as a process for validating the signed image file as well as a system for signing and validating these image files. The process for signing and authenticating or validating these image files comprises signing these image files with at least one private key, and then authenticating these image files with the corresponding public key. In addition, associated with the signing of these image files are custom claims or restrictions on use. Thus, along with the signing and authentication or validation of these image files, the types of use and duration of use of these image files can be controlled by the originator of the image file.

7 Claims, 8 Drawing Sheets

SYSTEM AND PROCESS FOR DELIVERING SECURE COMPUTERIZED CONTAINER BASED APPLICATIONS

CROSS REFERENCE TO RELATED APPLICATIONS

This application is a non-provisional application which claims priority from provisional application Ser. No. 63/252,745 filed on Oct. 6, 2021 the disclosure of which is incorporated herein by reference in its entirety.

BACKGROUND OF THE INVENTION

Containerized applications have become increasingly more common way to deliver computerized applications. Container images like docker and OCI images are ubiquitous in modern computer software applications to package and distribute software content. By packaging software applications and its dependencies using industry standard image format helps distributors and organizations(end-users) to share and reuse software code effectively. This also eliminates the need for the end-users to install and manage dependencies for the distributed software. Most of these images are generally downloaded from public repositories (e.g. hub.docker.com). Large software organizations do maintain their own docker repository, but they still want a reliable way to authenticate the image content during application runtime.

As the use of container images grows exponentially, there is a need for these images to be signed and labeled effectively so that the end users of the application can trust the images that they install in their systems. Also, additional attributes like image expiry help effectively secure application runtime environment.

Docker's recommended solution for image signing is to use an external system called notary (https://github.com/theupdateframework/notary) to manage the authenticity of the image contents.

Notary is a client-server technology that warrants a centralized server and a database to manage image signing. Both the producer and the consumer have to have access to the same server and database to validate the signature.

More details on how the image signing process works with docker content trust (DCT) is documented here—https://docs.docker.com/engine/security/trustNsigning-images-with-docker-content-trust.
The lack of Federated authentication introduces a single point of failure which is detrimental to consumers and is difficult to manage at scale.

SUMMARY OF THE INVENTION

One embodiment of the invention is designed to alleviate these challenges by signing the content of the docker image manifest and ship it along with the docker image manifest. The contents of the image manifest (the image layers and other relevant information) are signed with an image producer's private-key (public key cryptography) and a unique authentication signature is generated. This signature is then embedded within the image manifest. By embedding the signature along with the other contents of the image manifest, the end user's system can easily validate the authenticity of the downloaded image using the associated public key. This also eliminates the need to centrally store the list of signed images. By managing a list of authorized public keys, the end-user's system can reliably validate and allow the use of the signed docker and OCI images. The images that are not signed by trusted source can be rejected by the end-user's system from being deployed.

Additionally, one embodiment allows expiry date to be set for signature. Setting expiry for the docker and OCI images allows end-user's system to perform additional set of validation before being allowed to run within their infrastructure.

An image file such as a Docker image file is a file used to execute code in an associated container. Images act as a set of instructions to build an associated container, like a template. Images also act as the starting point when using a system such as Docker. An image is comparable to a snapshot in virtual machine (VM) environments.

A container is a standard unit of software that packages up code and all its dependencies, so the application runs quickly and reliably from one computing environment to another. A Docker container image is a lightweight, standalone, executable package of software that includes everything needed to run an application: code, runtime, system tools, system libraries and settings. Ultimately a image is referred as a container when they run on an associated engine such as Docker Engine.

Containers are different from virtual machines in that containers virtualize the operating system instead of the hardware, thus containers are more portable and efficient. Containers can ultimately be used as microservices or SAAS (software as a service) and be distributed across different networks.

Thus, there is created both a process for signing an image manifest as well as a process for validating the signed image manifest as well as a system for signing and validating these image files.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
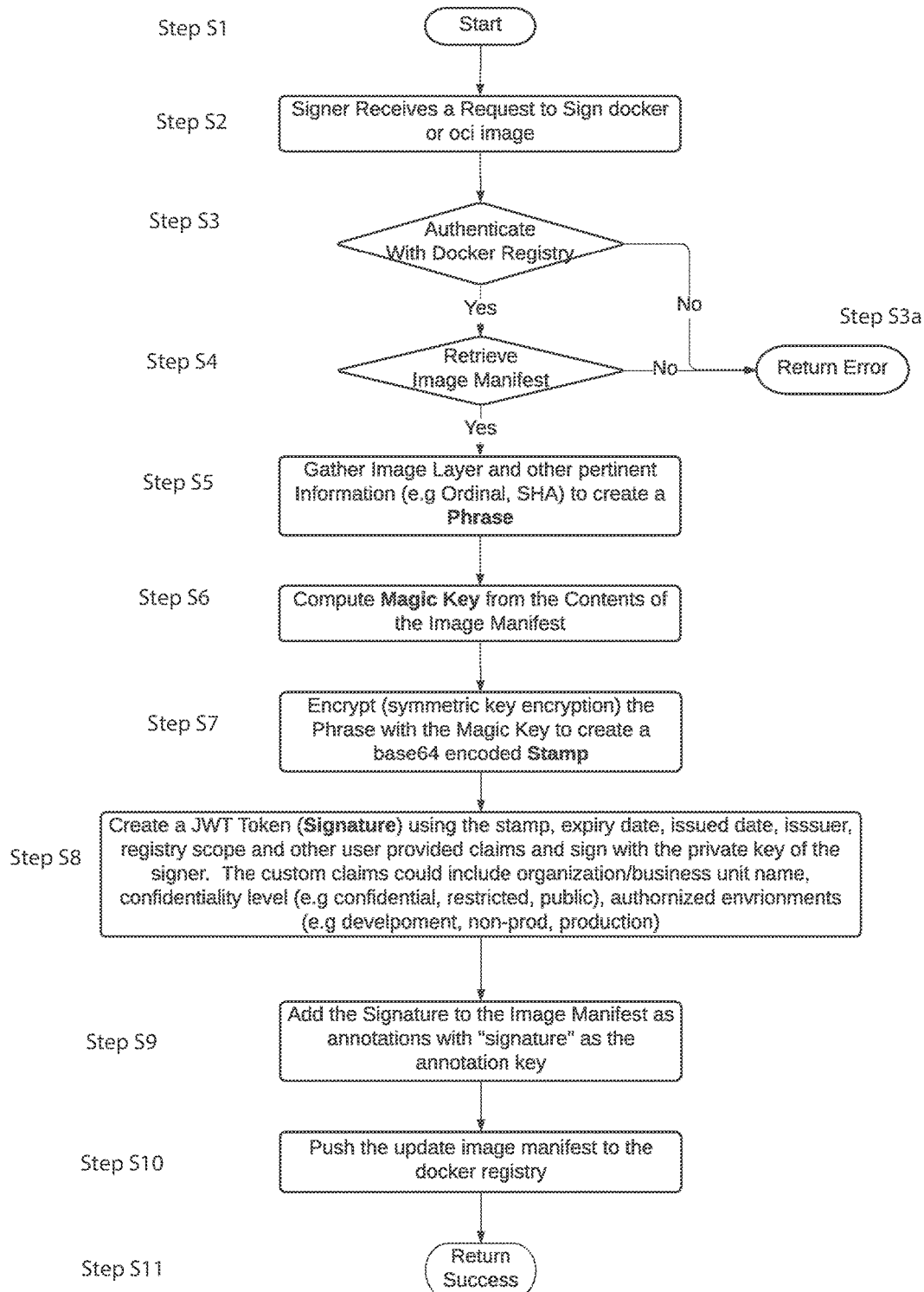
FIG. 1. is a flow chart for authenticating an image manifest with a key.
Figure 3A:
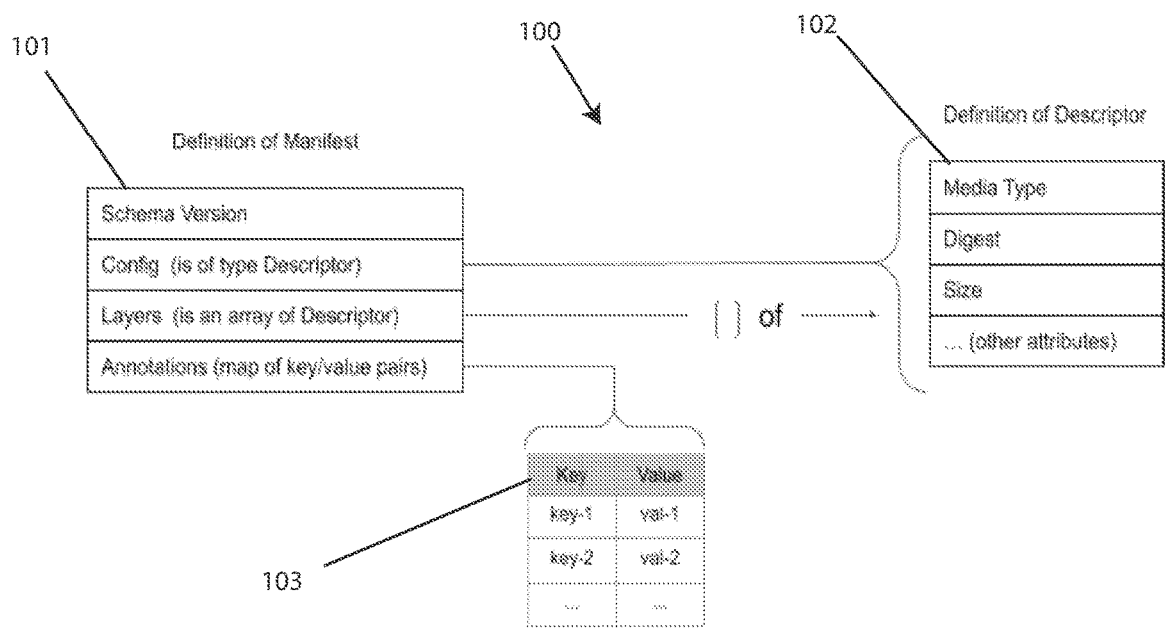
FIG. 3A is a view of a docker image and manifest format.
Figure 3B:
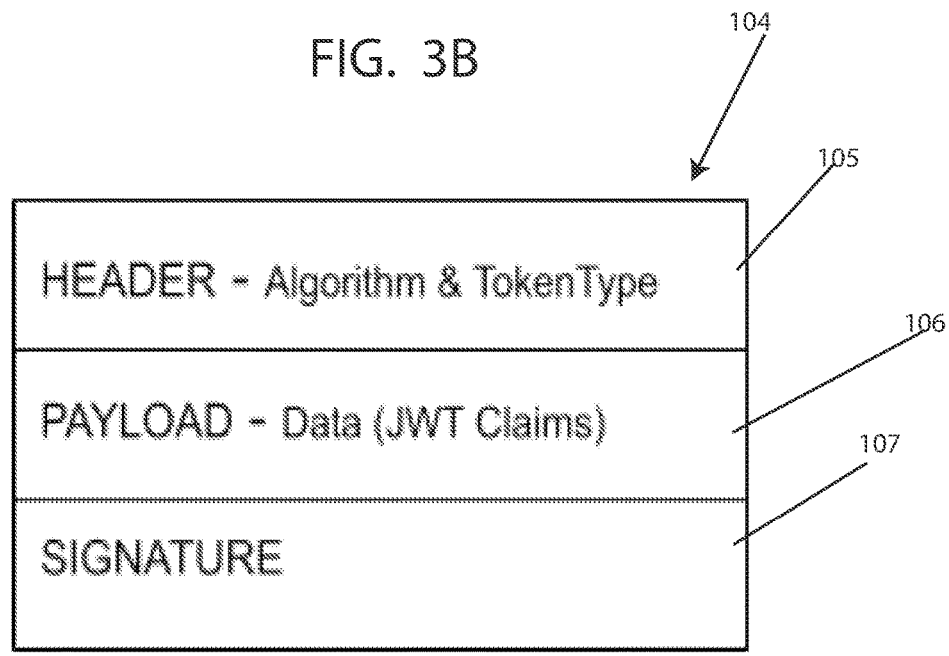
FIG. 3B is a view of the JWT or JSON web token that is created.
Figure 4:
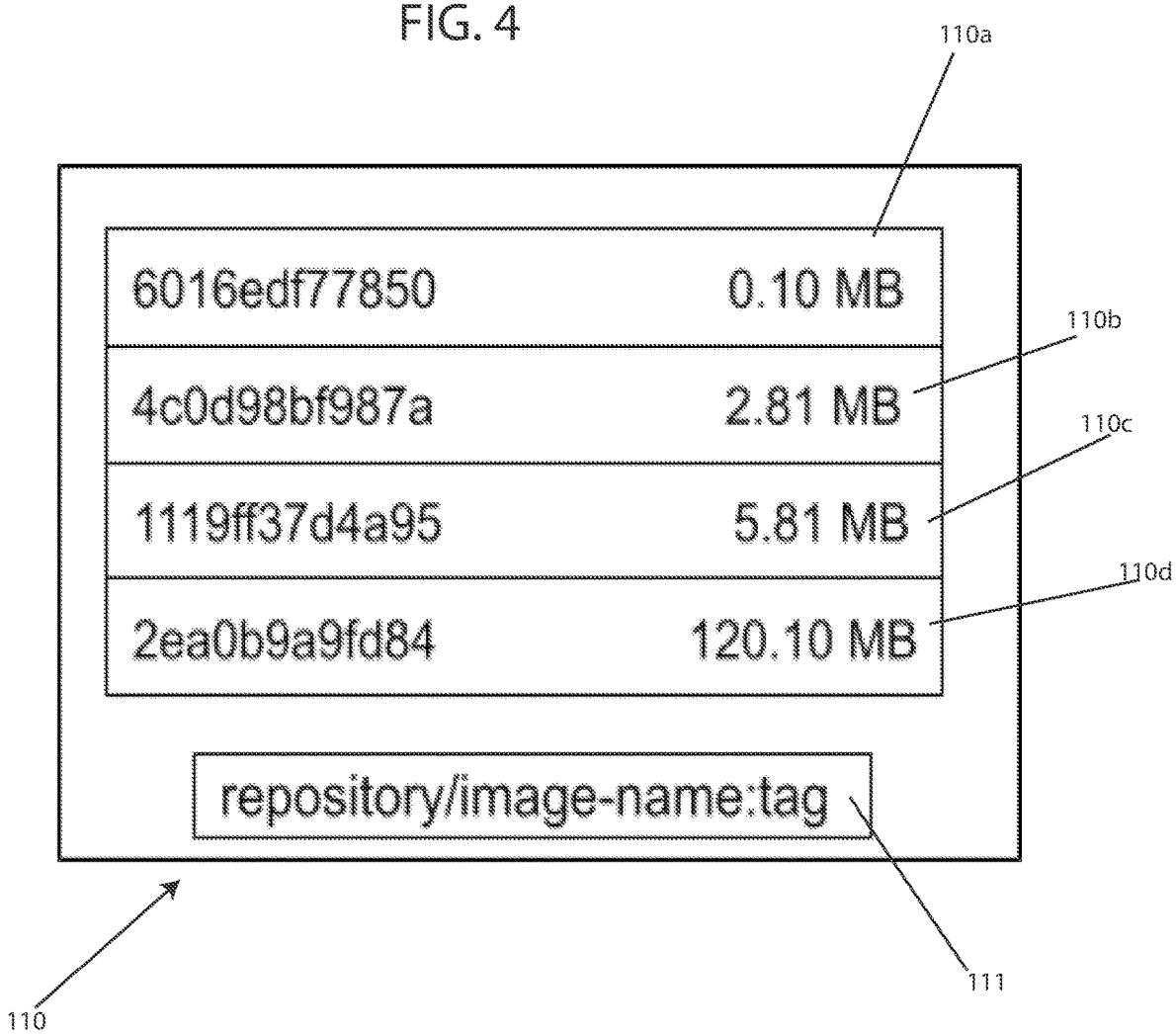
FIG. 4 is a schematic block diagram of an image file.
Figure 5:
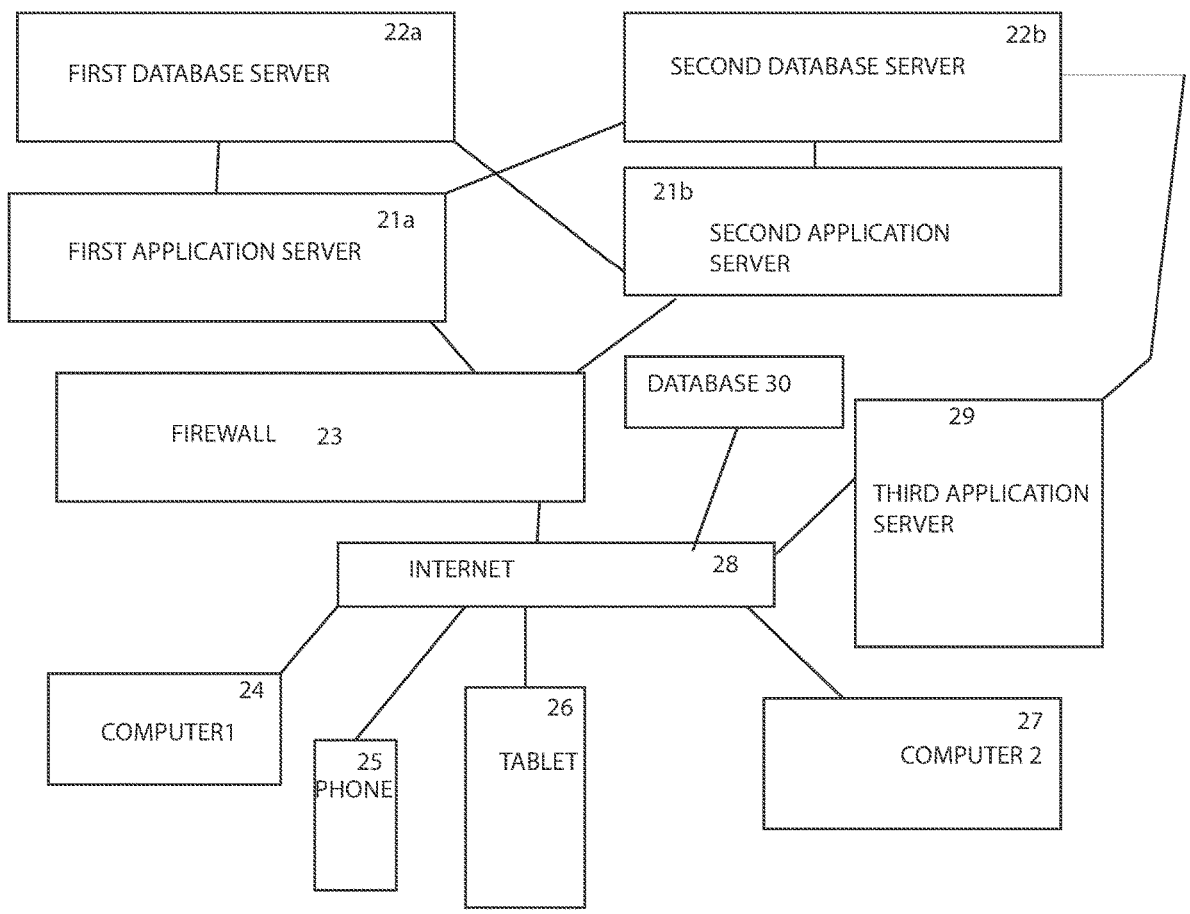
FIG. 5 is a schematic block diagram for a computer network for creating an authenticated container and for delivering an authenticated container.

Referring to the drawings, FIG. 1. is a flow chart for signing an image manifest with a key and the process is performed using the components shown in FIGS. 3, 4, and 5. For example, the process is performed using the microprocessor 222 disposed in a server such as server 21 which is the application server. The process begins in step S1 wherein a user creates a container image such as a docker image in step S1 and then receives a request to sign the docker or OCI image (open container image) in step S2. Next, in step S3 the process proceeds to step S3 wherein the system will authenticate the image with a registry such as docker registry. If the image cannot be authenticated, then in step S3a it returns an error. Alternatively, if the system authenticates the image with the docker registry then in step S4 it retrieves the image manifest. This authentication is initiated by the signing server and performed by the registry server. Next, in step S5 the system gathers the image layer and other pertinent information such as an Ordinal and SHA from the manifest to create a phrase (a passphrase). Next, in step S6 the system, particularly the application server 21 using microprocessor 222 can then create a magic key from the contents of the image manifest. Next, in step S7 the system can encrypt the image using symmetric key encryption such that the phrase with the magic key is used a base 64 encoded stamp. Next, in step S8, the system creates a JWT (Java web token) or similar type token as a signature using a stamp which includes a stamp, an expiry date, an issued date, an issuer, a registry scope and other user provided claims and sign with the private key of the signer. The custom claims could include organization and/or business unit name, confidentiality level such as confidential restricted or public security level, authorized environments, such as development, non-production, and production. Thus, these additional claims allow for greater control and distribution of images which then allows for validation of non-authorized copying of these images as well as distribution control of these images. Because of the additional control of these images, it also allows for monetization of these images.

Next, in step S9, the system can add a signature to the image manifest as annotations with "signature" as the annotation key. Next, in step S10 the system can push the update image manifest to the docker registry, which can be stored in a registry server 22.

Next, in step S11 the system can return a success indication that the image has been secured with a key and stored with a signature in the registry and/or database. One example of a database server is a registry server, which is a repository for all the images and authenticates the identities of the users logging in.

Figure 2A:
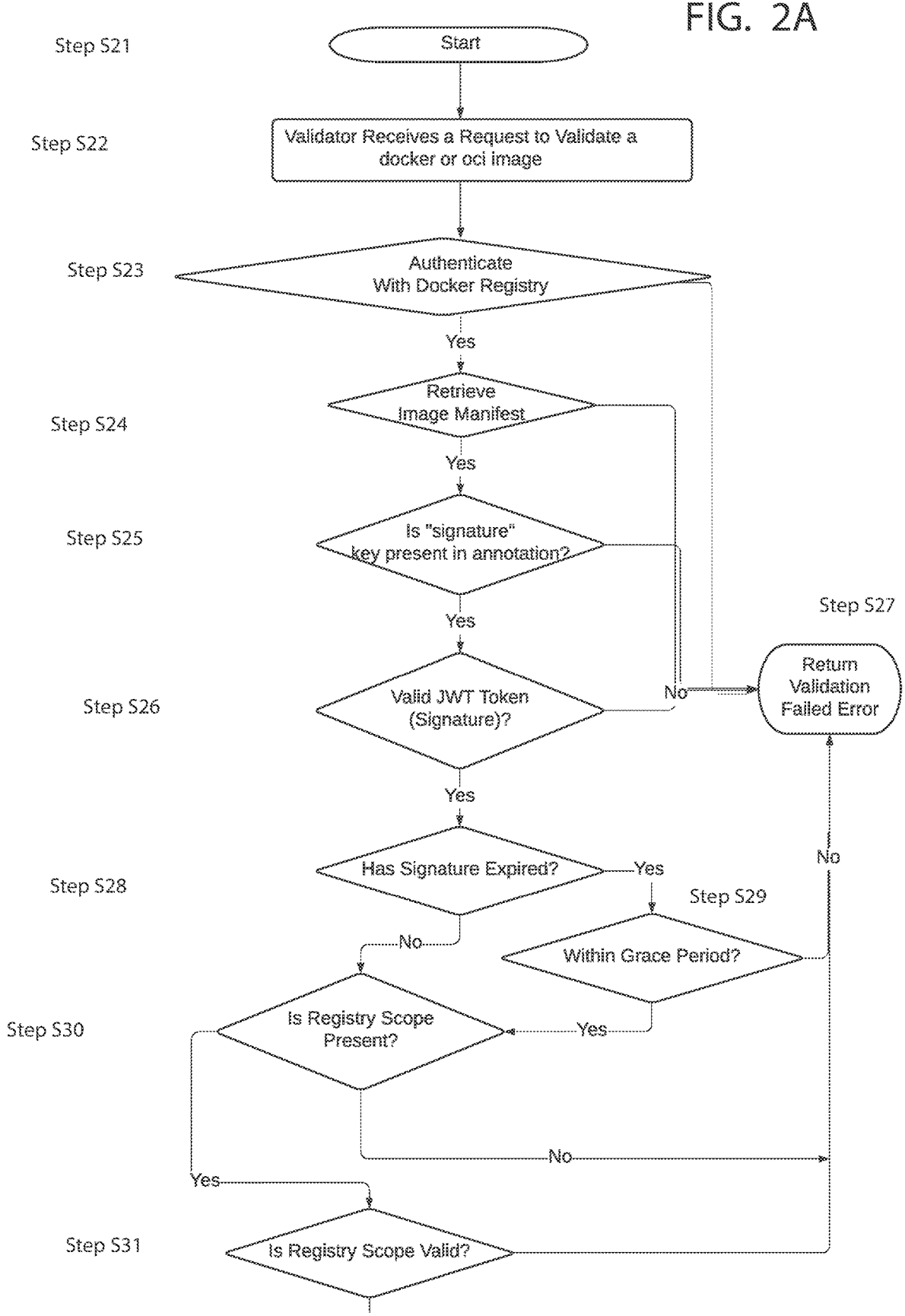
FIG. 2A is a flow chart for using and downloading an authenticated image manifest.

FIG. 2A is a flow chart for using and downloading an signed image. For example, this process begins in step S21 wherein the process begins receiving the image to be authenticated. Next, in step S22 a validator in the form of an algorithm running on an application server such as application server 21 receives a request to validate an image or OCI image. Next, in step S23 the system will authenticate the user with a registry such as a docker registry. Next, in step S24, the system will retrieve an image manifest based upon instructions from application server 21 to registry server 22.

Next, in step S25 the system determines whether the signature key is present in an annotation. With the presence of the signature key associated with an image file, this signature key can then be used to read the JWT (JSON web token).

Next, in step S26 the system determines whether they have received a valid JWT token signature. If yes, then the system proceeds to step S28. Alternatively, if any one of the steps S23-S26 fails, then the system in step S27 returns a validation failed error and proceeds to step S31.

In step S28, the system determines whether the signature has expired. If the signature has expired and was within a grace period as determined in step S29, then the process proceeds to step S30. Alternatively, if the signature was not within a grace period, then the process proceeds to step S27, wherein the expired signature returns a validation error. In step S30, the system determines whether the registry scope is present. If the registry scope is present in step S30, then the process proceeds to step S31. Alternatively, if the registry scope is not present, then the system proceeds back to step S27 to return a validation failed error. Ultimately, if the registry scope is valid the system proceeds to step S31 to indicate that it is valid.

Figure 2B:
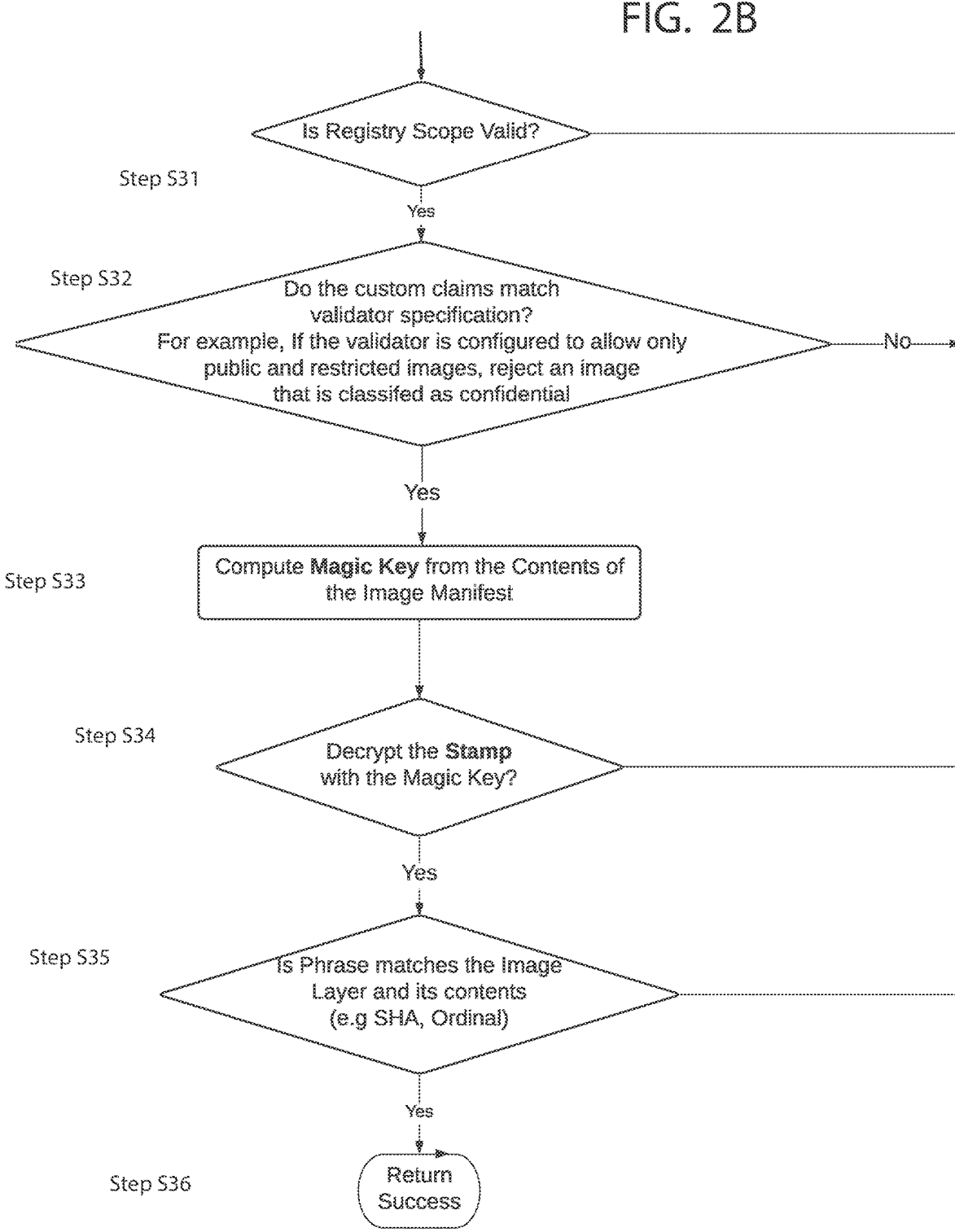
FIG. 2B shows the continuation of the process for authenticating an image from an image registry.

FIG. 2B shows the continuation of the process for authenticating an image from an image registry. Thus, with this embodiment, the process continues in step S32 wherein the system determines whether the custom claims match the validator specification. In this step the system determines whether the validator is configured to allow only public and restricted images and to reject an image that is classified as confidential. Thus, depending on the rights bestowed on the image by a party who sets up and certifies an image, another party with the signer's public certificate would only have certain limited rights to use the image or have access to the image.

Next, in step S33 the system computes the magic key from the contents of the image manifest. By computing the magic key, the system can then in step S34 decrypt the stamp with the magic key. Next, in step S35 the system determines whether the phrase matches the image layer and its contents. If yes, then in step S36 the system returns a successful result releasing the image. If any one of the above steps S31-S35, the results fail or register a No or negative result, then the system proceeds back to step S27 to return a validation or failed error.

FIG. 3A is a view of a docker image and manifest format 100. This view is a schematic layout of the definition of the manifest 101. The manifest includes the schema version, the config, which is a type of a descriptor, layers which are an array of a descriptor, and annotations which is map of the key/value pairs. The annotations ultimately result in the shown key value pairs 103. These "signature" key value pair in 103 was created in step S9 shown in FIG. 1.

Opposite the definition of the manifest is the definition of the descriptor 102 which includes the media type, the digest, the size and any other attributes.

FIG. 3B is a view of the JWT or JSON web token that is created The Json web token JWT is used to create the signature which is used to sign the image of the user. The JSON web token 104 includes a header 105 which includes an algorithm and token type, there is also a payload 106 as well as a signature 107 included. This JWT is created in step S8 and used to authenticate the image in step S26.

FIG. 4 is a schematic block diagram of an image file 110. The image file includes a plurality of characteristic elements of image layers 110a, 110b, 110c, and 110d. There is also a tag 111 which can be linked to the signed manifest file.

FIG. 5 is a schematic block diagram of the components of a computer network which is configured to form the system described above. For example, there are shown a plurality of distributed consumer electronic devices such as a computer 24, a phone 25, a tablet 26, another computer 27. These end user electronic components are configured to communicate through the internet 28 to a plurality of servers that run the containers. In addition, connected to the internet is a firewall 23 which sits in front of either a first application server 21a or a second application server 21b. In at least one embodiment, the first application server 21a can be used as an authentication server which can be used to generate the authentication protocols shown in the process of FIG. 1, while application server 21b can be used as a validator server which can be used to validate these image signing protocols shown in FIGS. 2A and 2B.

Coupled to these application servers are either a first registry server 22a which houses the information relating to the images as well as the-image manifest file, or a second registry server 22b which holds the same type of information. Thus, with this system the application servers 21a and 21b as well as the registry servers 22a and 22b are load balanced. Furthermore, this system also allows for separate application servers such as third application server 29 to interface with any one of the database servers such as registry servers 22a and 22b, wherein this application server 29 is separate and remote from either one of the application servers 21a and/or 21b. There can also be a separate database server 30 which is unaffiliated with either one of the application servers 21a or 21b, but which is accessible over the internet. Thus, with this design, wherein the image is coupled to a manifest and/or descriptor, along with a key/value pair, the downloading, authentication and control of these images can be handled separate from a single repository. Rather, this repository can be distributed across multiple different networks and across multiple different databases, regardless of whether these databases are perfectly replicated.

Figure 6A:
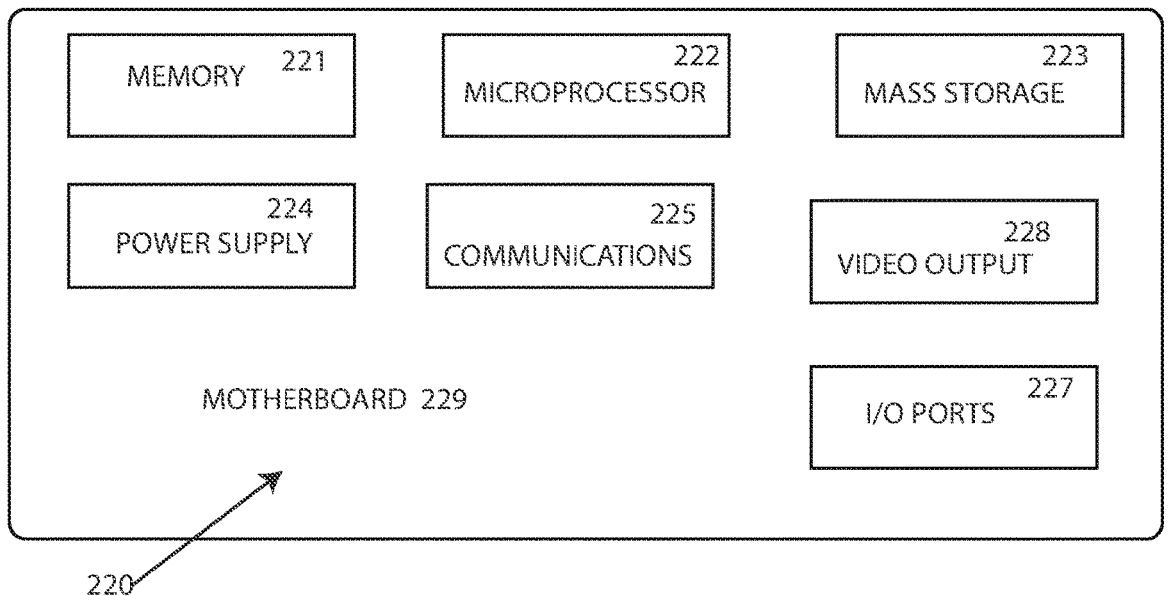
FIG. 6A is a schematic block diagram for the components of a server shown in FIG. 5.

FIG. 6A is a schematic block diagram of the different components of a computer such as any one of the servers 21a, 21b, 22a, 22b, or servers 29 or 30. For example, these components include a motherboard 229, a memory 221 coupled to the motherboard, a microprocessor 222 coupled to the motherboard, a mass storage 22 coupled to the motherboard, a power supply 224 coupled to the motherboard, a communications port (TCP/IP port) coupled to the motherboard, a video output 228 such as a video card coupled to the motherboard and various input and output ports 227 coupled to the motherboard. As described above, the system includes at least one of the servers, particularly any one of the application servers 21a, 21b or 29 running a set of instructions which are stored either in memory 221 or mass storage 223 (hard drive) wherein these set of instructions are uploaded to a microprocessor 222 which then performs these instructions which are indicated through the flow charts of FIGS. 1, 2A and 2B.

Figure 6B:
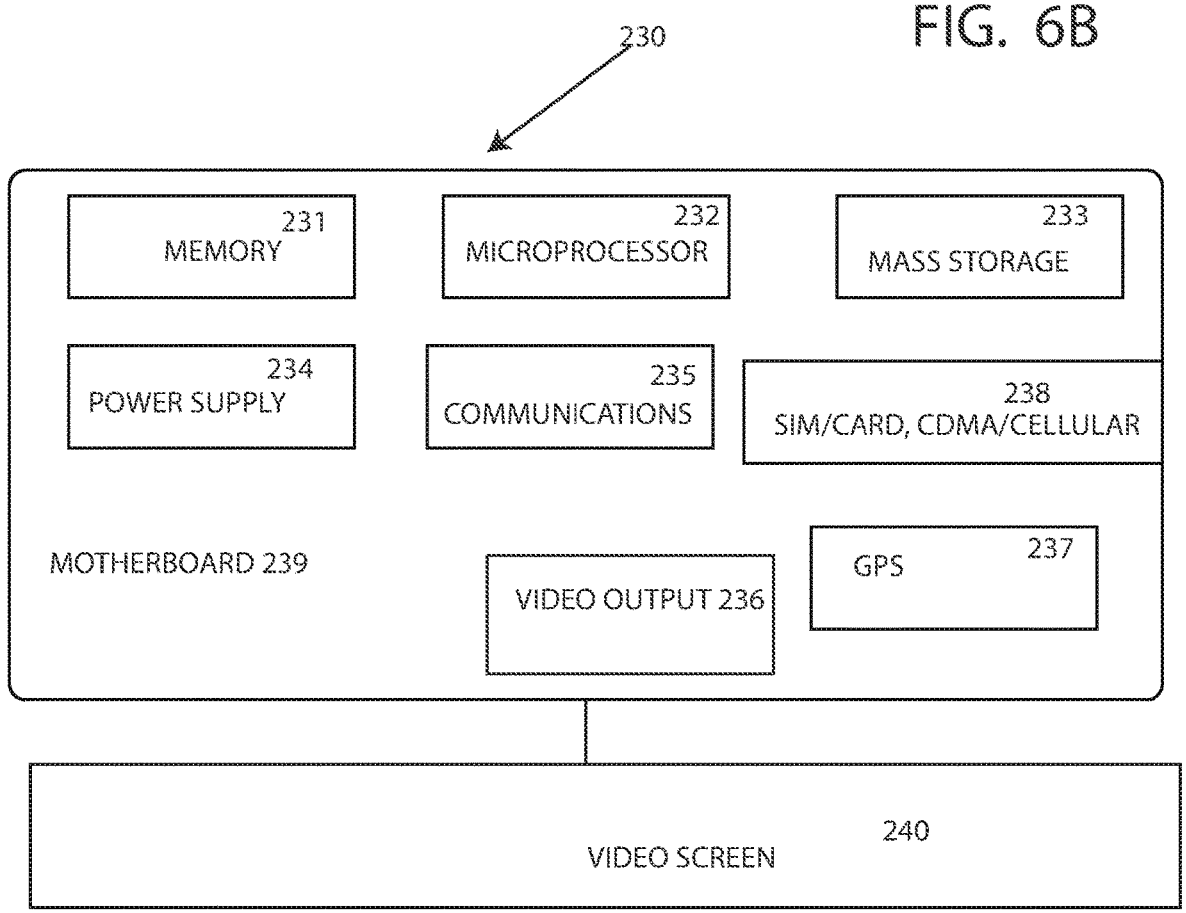
FIG. 6B is a schematic block diagram for the electronic components of a remote device shown in FIG. 5.

FIG. 6B discloses the schematic block diagram of the electronic components of the distributed electronic devices such as the computer 24, the phone 25, the tablet 26, or the other computer 27. These components can include a motherboard 239, a memory 231 coupled to the motherboard, a microprocessor 232 coupled to the motherboard, a mass storage device 233 (hard drive or other type of data storage) a power supply 234 such as a wired power supply or a battery, a communications port 235, a SIM card (optional) 238, a video output 236, a GPS 237 (optional) and a video screen 240. On this video screen the user can input information such as the public key and or private key information which can then be used to unlock the image(s) stored in the database(s) 22a and/or 22b or 30.

Figure 7:
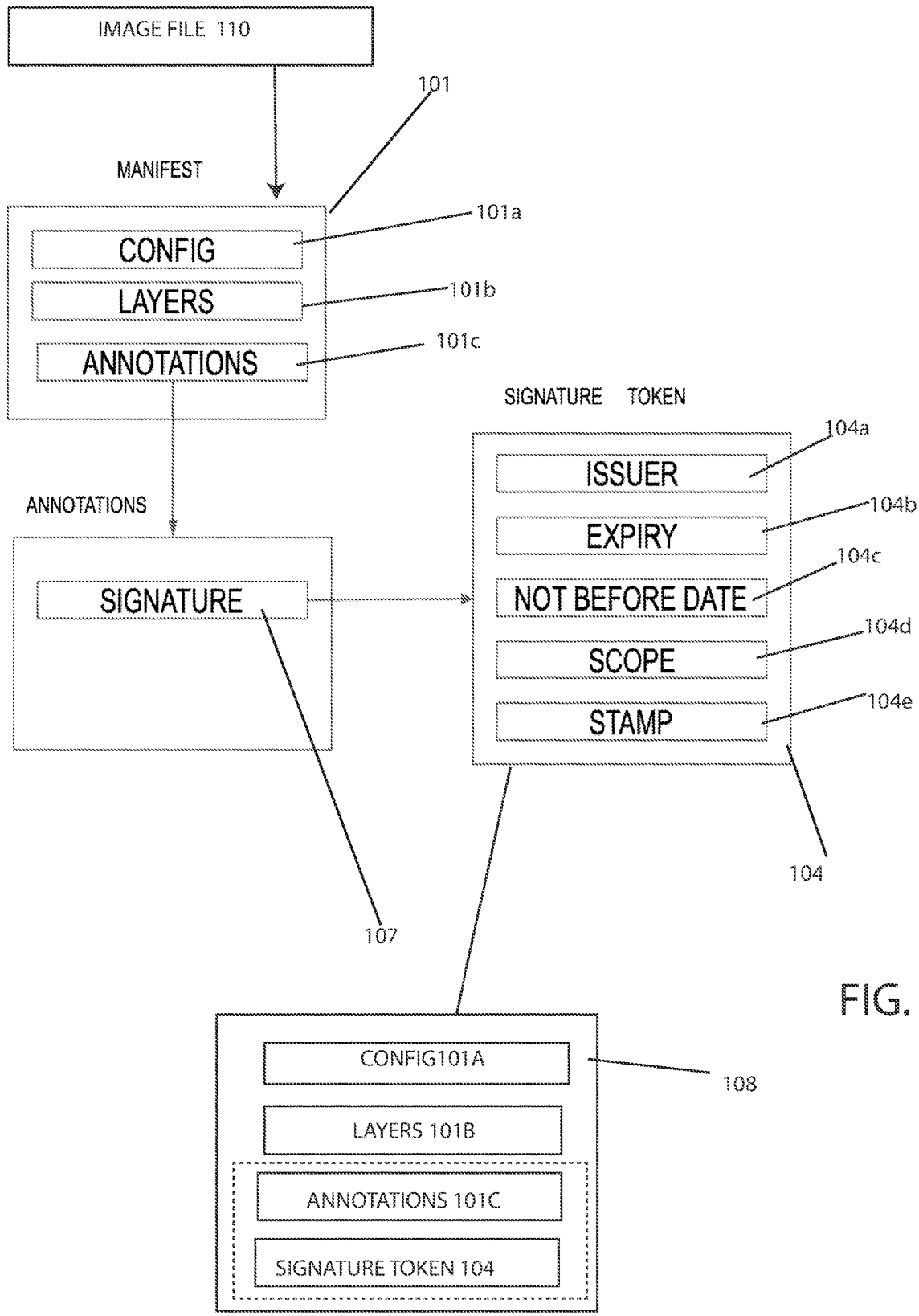
FIG. 7 is a graphical representation of an image file and its associated signed manifest file.

FIG. 7 is a view of the components that are used with the process as in FIGS. 1-2B. Thus, there is an image file 110 which can be a docker image file. This docker image file can be expressed as an image manifest 101. The image manifest is a textual representation—such as a json format of the image file.

The image manifest 101 comprises a configuration portion 101a, one or more layers 101b, and an annotation portion 101c. The image manifest which is listed as a JSON file can be amended such that a signature is added to this file to create a signed manifest 108. The signature 107 can be expressed as a signature token 104. A signature token is also a 256 bit encryption pattern which is made from the following characteristics. For example, this token is made from the following components an issuer component 104a, an expiry component 104b, a not before date component 104c, a scope 104d, and a stamp 104e. The JWT signature token is created using the microprocessor 222 of at least one application server such as application server 21a, 21b, or 29 to generate the signature token 104. The signature token is meshed into the annotations 101c so that it becomes part of a modified manifest 108. The modified manifest 108 shows that the annotations 101c and the signature token 104 form part of a JSON file which forms the entire manifest.

Thus, with this signature token 104, the modified manifest 108 can form an authenticatable manifest which can be authenticated via an authentication server such as any one of application servers 21a, 21b, and 29. The modified manifest 108 can be stored in any one of the database servers 22a, and/or 22b or any other suitable database server which can serve as an authenticatable registry.

Thus, leveraging the contents of manifest 101, the server such as the server 21a, 21b or 29 or any other application server (See FIG. 5) can, via a microprocessor 222, (See FIG. 6A) generate a JWT or web token 104 and add as a signature 107 in step S8 to create a modified manifest file 101 which can be used for authenticating the image as shown in steps S25 to S35.

Ultimately, what is created is a system and process for signing and authenticating images such as docker images via a key/value pair wherein the originator can sign the image and consumer of the image can authenticate, using the public key of the signer, the image based upon the signature, control the duration of distribution (time length or time period for distribution, which party), the rights associated with each distribution, the regions where the distribution occurs etc. by connecting the image with the definition of the manifest Accordingly, while at least one embodiment of the present invention have been shown and described, it is to be understood that many changes and modifications may be made thereunto without departing from the spirit and scope of the invention as defined in the appended claims.

What is claimed is:

1. A process for signing and authenticating an image file comprising the steps of:
    creating an image manifest file comprising image file contents wherein said image file contents are signed;
    authenticating an author of said image file, using a public certificate of the author;
    retrieving an image manifest from a central registry wherein the image manifest is stored;
    using the image manifest to create at least one signature key associated with the image file contents of the image manifest;
    creating a signing and authentication protocol for the image file based upon the image manifest and at least one private key to create a token;
    creating a phrase based upon information in the image file;

encrypting via symmetric key encryption the phrase with the signature key to create a stamp having associated information.

2. The process as in claim 1, further comprising the step of creating a token in a form of a signature using said associated information from said stamp.

3. The process as in claim 2, further comprising the step of adding said signature to said image manifest to associate the signature with the image manifest.

4. The process as in claim 3, further comprising the step of forwarding the image manifest having the added signature to the central registry.

5. The process as in claim 1, wherein said associated information from said stamp includes at least one of an expiry date, an issued date, an issuer, or a registry scope.

6. The process as in claim 5, wherein said associated information from said stamp further comprises user provided claims.

7. The process as in claim 6, wherein said user provided claims comprises at least one of an organization name, a business unit name, a confidentiality level, or a list of authorized environments.

* * * * *